US012119172B2

(12) United States Patent
Farrell

(10) Patent No.: US 12,119,172 B2
(45) Date of Patent: Oct. 15, 2024

(54) MAGNETIC MAT DEVICE

(71) Applicant: James Farrell, Philadelphia, PA (US)

(72) Inventor: James Farrell, Philadelphia, PA (US)

( * ) Notice: Subject to any disclaimer, the term of this patent is extended or adjusted under 35 U.S.C. 154(b) by 204 days.

(21) Appl. No.: 17/881,229

(22) Filed: Aug. 4, 2022

(65) Prior Publication Data

US 2023/0037600 A1 Feb. 9, 2023

Related U.S. Application Data

(60) Provisional application No. 63/229,183, filed on Aug. 4, 2021.

(51) Int. Cl.

| | |
|---|---|
| ***H01F 7/02*** | (2006.01) |
| ***A47G 27/02*** | (2006.01) |
| ***F21S 9/02*** | (2006.01) |
| ***H01F 7/06*** | (2006.01) |
| *F21Y 115/10* | (2016.01) |

(52) U.S. Cl.

CPC ............... *H01F 7/02* (2013.01); *A47G 27/02* (2013.01); *F21S 9/02* (2013.01); *H01F 7/0257* (2013.01); *H01F 7/06* (2013.01); *F21Y 2115/10* (2016.08)

(58) Field of Classification Search

CPC . H01F 7/02; H01F 7/0257; H01F 7/06; A47G 27/02; F21S 9/02

See application file for complete search history.

(56) References Cited

U.S. PATENT DOCUMENTS

| | | | | |
|---|---|---|---|---|
| 2004/0053002 A1* | 3/2004 | Kobayashi | ........... | D06N 7/0071 428/101 |
| 2004/0088788 A1* | 5/2004 | Alane | ................ | A47G 27/0237 5/420 |
| 2004/0250346 A1* | 12/2004 | Vasishth | ............ | A47G 27/0237 5/420 |
| 2009/0280295 A1* | 11/2009 | Prince | ................ | A47G 27/0218 428/131 |
| 2020/0326065 A1* | 10/2020 | Bergman | ........... | A47G 27/0206 |

* cited by examiner

*Primary Examiner* — Evan P Dzierzynski
*Assistant Examiner* — Nathaniel J Lee
(74) *Attorney, Agent, or Firm* — Brennan, Manna & Diamond, LLC

(57) ABSTRACT

The present invention relates generally to the field of floor mats. More specifically, the present invention relates to a magnetic mat device that prevents a user from wasting excessive amounts of time searching for nuts, bolts, screws, sockets, or other parts that fall onto the floor while working. The device is primarily comprised of a body, further comprised of a top layer, a middle layer, further comprised of at least one magnet, and a bottom layer. Further, the top layer is comprised of a top surface that helps prevent against slips as well as stains from oils and other liquids. Further, the bottom surface is comprised of protrusions that prevent the device from sliding on the floor. The device is also comprised of a side surface comprised of at least one magnet to attach multiple devices together to encompass any size workstation.

11 Claims, 3 Drawing Sheets

MAGNETIC MAT DEVICE

CROSS-REFERENCE TO RELATED APPLICATION

The present application claims priority to, and the benefit of, U.S. Provisional Application No. 63/229,183, which was filed on Aug. 4, 2021, and is incorporated herein by reference in its entirety.

FIELD OF THE INVENTION

The present invention relates generally to the field of floor mats. More specifically, the present invention relates to a magnetic mat device that prevents a user from wasting excessive amounts of time searching for nuts, bolts, screws, sockets, or other parts that fall onto the floor while working. The device is primarily comprised of a body, further comprised of a top layer, a middle layer, further comprised of at least one magnet, and a bottom layer. Further, the top layer is comprised of a top surface that helps prevent slips as well as stains from oils and other liquids. Further, the bottom surface is comprised of protrusions that prevent the device from sliding on the floor. The device is also comprised of a side surface, comprised of at least one magnet to attach multiple devices together to encompass any size workstation. The device allows mechanics and laymen to not waste time searching for lost parts, as well as allowing for a more comfortable area for users to lay on while they are working on the ground. The device further provides a novel magnetic grid layer to attract and secure metallic items that are dropped or lost while working. Accordingly, the present disclosure makes specific reference thereto. Nonetheless, it is to be appreciated that aspects of the present invention are also equally applicable to other like applications, devices, and methods of manufacture.

BACKGROUND

By way of background, vehicles are often comprised of many intricate parts, some of which are very small. These parts are often metal such as nuts, bolts, screws, sockets, etc., and are often difficult to work with. Because of this, many parts are dropped onto the ground. Mechanics and laymen often spend excessive amounts of time looking for parts that were dropped while working on the vehicle. Specifically, many mechanics work for a flat rate, so spending large amounts of time searching for lost parts directly and negatively affects their profits. Further, when mechanics and other individuals work under vehicles, they often must lie down on their back to work under the vehicle. In addition, it is often very difficult for mechanics and laymen to see while they are working under vehicles because of the lack of light. It can be challenging to hold a flashlight while working, as well as frustrating if the user has to set the light underneath the vehicle because a bulky light can get in the way.

Therefore, there exists a long-felt need in the art for an improved floor mat. Further, there exists a long-felt need in the art for a magnetic floor mat that can prevent dropped vehicle parts from rolling away and becoming lost. There also exists a long-felt need in the art for a magnetic floor mat that can be used on a multitude of floor areas and workstations. There also exists a long-felt need in the art for a novel floor mat that allows mechanics to save time and money by no longer having to search for dropped parts. There also exists a long-felt need in the art for a comfortable mat for individuals to lie on while working on a vehicle that also prevents parts from rolling away from the user. Further, there exists a long-felt need in the art for a floor mat that has a light source which allows users to see while they are working on vehicles in any lighting condition.

The subject matter disclosed and claimed herein, in one embodiment thereof, comprises a magnetic mat device. The device is primarily comprised of a body, further comprised of a top layer, a middle layer, further comprised of at least one magnet, and a bottom layer. Further, the top layer is comprised of a top surface that helps prevent against slips as well as stains from oils and other liquids. The bottom surface is comprised of protrusions that prevent the device from sliding on the floor. The device is also comprised of a side surface comprised of at least one magnet to attach multiple devices together to allow the device to cover any size area. In one embodiment, the device is comprised of at least one wheel that allows a user to easily maneuver while lying on the device. Further, the device may be comprised of at least one pouch that provides a user with a way to store other supplies that may not be magnetized to the device.

In this manner, the magnetic mat device of the present invention accomplishes all of the foregoing objectives and provides a novel floor mat that uses magnetism to prevent parts and tools from rolling away from users. Further, the device allows users to not have to spend excessive amounts of time searching for lost tools and parts.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a magnetic mat device. The device is primarily comprised of a body, further comprised of a top layer, a middle layer, further comprised of at least one magnet, and a bottom layer. Further, the top layer is comprised of a top surface that helps prevent against slips as well as stains from oils and other liquids. Further, the bottom surface is comprised of protrusions that prevent the device from sliding on the floor. The device is also comprised of a side surface, comprised of at least one magnet to attach multiple devices together to encompass any size workstation. In one embodiment, the device is comprised of at least one wheel that allows a user to easily maneuver while lying on the device. Further, the device may be comprised of at least one pouch that provides a user with a way to store other supplies that may not be magnetized to the device.

In one embodiment, the device is comprised of at least one handle that is located on the side wall which allows a user to transport the device with minimal effort In another embodiment, the device is comprised of at least one strap that allows a user to carry the device over the shoulder.

In yet another embodiment, the device is comprised of at least one hook located on the side surface that allows a user to hang the device on a wall for storage.

In yet another embodiment, the device is comprised of straps that can be attached together via fasteners when the device is rolled up. This allows the user to roll the device and fasten the straps to store the device in tight spaces.

Accordingly, the magnetic mat device of the present invention is particularly advantageous as it provides users with a novel mat that prevents tools, parts, screws, nuts, bolts, etc., from becoming lost while a user is working. In this manner, the magnetic mat device provides a solution to the issue of losing and misplacing parts when working with small parts of vehicles.

Numerous benefits and advantages of this device will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
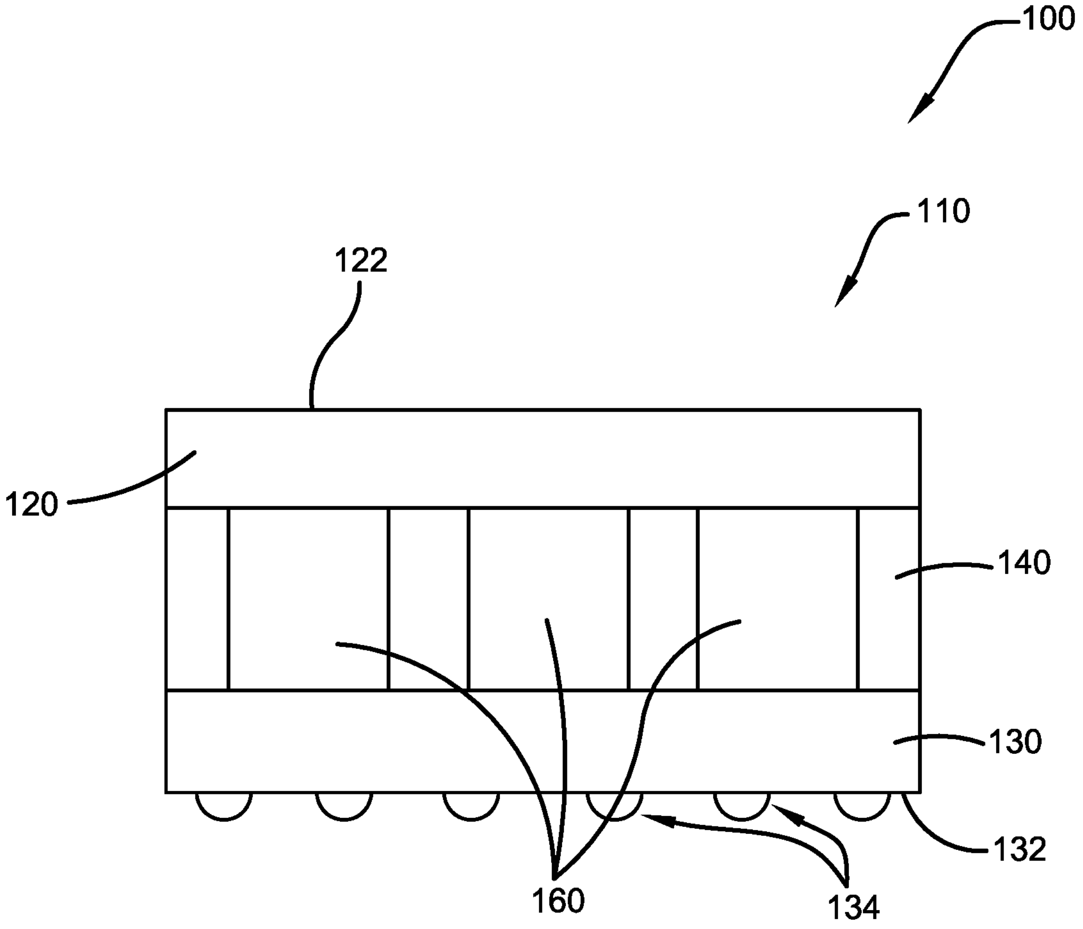
FIG. 1 illustrates a cross-sectional side view of one potential embodiment of a magnetic mat device of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for an improved floor mat. Further, there exists a long-felt need in the art for a magnetic floor mat that can prevent dropped vehicle parts from rolling away. There also exists a long-felt need in the art for a magnetic floor mat that can encompass a multitude of floor areas and workstations. Further, there exists a long-felt need in the art for a novel floor mat that allows mechanics to save time and money by no longer having to search for dropped parts. There also exists a long-felt need in the art for a floor mat that has a light source which allows users to be able to see while they are working on vehicles in any lighting condition.

The present invention, in one exemplary embodiment, is comprised of a magnetic mat device. The device is primarily comprised of a body, further comprised of a top layer, a middle layer, further comprised of at least one magnet, and a bottom layer. Further, the top layer is comprised of a top surface that helps prevent against slips as well as stains from oils and other liquids. Further, the bottom surface is comprised of protrusions that prevent the device from sliding on the floor. The device is also comprised of a side surface, comprised of at least one magnet to attach multiple devices together to encompass any size workstation. In one embodiment, the device is comprised of at least one wheel that allows a user to easily maneuver while lying on the device. Further, the device may be comprised of at least one pouch that provides a user with a way to store other supplies that may not be magnetized to the device. Further, the device may be comprised of a light source, further powered by a battery. This allows users to be able to see in all conditions.

Referring initially to the drawings, FIG. 1 illustrates a cross-sectional side view of one potential embodiment of a magnetic mat device 100 of the present invention in accordance with the disclosed architecture. The device 100 is primarily comprised of a body 110, further comprised of a top layer 120, a middle layer 140, further comprised of at least one magnet 160, and a bottom layer 130. In the preferred embodiment, the body 110 is made from at least one rubber material such as, but not limited to, natural rubbers, neoprene rubber elastomer, silicone rubber elastomer, ethylene propylene diene monomer rubber, butyl rubber, nitrile rubber, buna-n rubber, styrene-butadiene rubber elastomers, Viton rubber elastomer, diaphragm rubber, thermoplastic rubber, etc. Further, the body 110 may be any size. The body 110 also may be a plurality of different shapes such as, but not limited to: circular, square, ovular, rectangular, triangular, etc.

The body 110 is further comprised of a top layer 120 with a top surface 122. In the preferred embodiment, the top surface 122 is coated with or made from a non-slip material such as, but not limited to: silicone, latex, neoprene, EPDM, PVC foam, polyethylene, sponge rubber, silicone foam, urethane, cork, ridged rubber, felt, acrylic, polyester & SBR, etc. In the preferred embodiment, the top surface 122 is also comprised of an oil repellant coating. This coating may be a plurality of coatings such as, but not limited to: hydrophobic nano-coating treatments, oleophobic coating, nylon, polyimides, ABS, polycarbonate, bismaleimide triazine, SU8, polyesters, oxide-reinforced polymers, polysiloxanes, etc. The top surface 122, having a non-slip coating, allows the user to not slide on the device 100 while they are working on a vehicle. The top surface 122 being oil repellent, prevents oil and other liquids from soaking into the device 100 while the user is working on the vehicle. Further, the oil repellant coating on the top surface 122 allows for easy clean up when materials are inevitably spilled on the device 100. Further, the top surface 122 may be made from a padded material for added comfort.

The body 110 is further comprised of a bottom layer 130 with a bottom surface 132. The bottom layer 130 may be comprised of at least one rubber such as, but not limited to: natural rubbers, neoprene rubber elastomer, silicone rubber elastomer, ethylene propylene diene monomer rubber, butyl rubber, nitrile rubber, buna-n rubber, styrene-butadiene rubber elastomers, Viton rubber elastomer, diaphragm rubber, thermoplastic rubber, etc. The bottom surface 130 is further comprised of a plurality of protrusions 134. The protrusions 134 can be of any shape or size known in the art to prevent the mat from slipping while being used. The protrusions 134 may be made from any grip/non-slip material that is known in the art such as, but not limited to: silicone, ethylene-propylene, natural rubber, nitrile, neoprene, butyl, polyvinyl chloride, etc.

In one embodiment, the body 110 is further comprised of a middle layer 140, further comprised of at least one magnet 160. In another embodiment, the body has at least one magnet 160 placed between the top layer 120 and the bottom layer 130. In either embodiment, the magnets 160 can be any magnet 160 that is known in the art such as, but not limited to, neodymium iron boron, samarium cobalt, alnico, ferrite, electromagnet, etc. Further, the magnets 160 can be arranged in any orientation known in the art. These magnets 160 are what allow any dropped parts from a vehicle to attach to the device 100. In this manner, the magnets 160 allow the user to find and pick up lost parts and tools easily and conveniently from the device 100.

In one embodiment, the device 100 may be comprised of at least one pouch 200 located on the side wall 150 and/or the top surface 122. The pouch 200 may be made from any material known in the art such as, but not limited to, canvas, netting, leather, cloth, etc. The user can place tools or other items into the pouch 200 to prevent items from becoming misplaced. This provides a way to store items that otherwise would not be magnetized to the device 100. In a differing embodiment, the device 100 may be comprised of at least one tool pan 220 that is used to house and hold the user's personal items, or tools to prevent them from being misplaced. The tool pan 220 is preferably metal to magnetically attach to the device 100 to prevent the tool pan from being knocked over. The metal material that may be used is any material such as, but not limited to, stainless steel, aluminum, iron, etc. In one embodiment, the device 100 may be comprised of at least one wheel 210 located on the bottom surface 132. There are a plurality of wheel 210 types that may be used such as, but not limited to: thread on core, solid, flat free, semi-pneumatic, pneumatic, etc. The wheel 210 allows a user to maneuver under vehicles with minimal effort if the user is forced to lie on the device.

In one embodiment, the device 100 may be comprised of at least one handle 170 located on the side surface 150. The handle 170 can be any handle known in the art. The handle 170 allows the user to transport the device 100 easily and conveniently. In another embodiment, the device 100 may be comprised of at least one strap 172. The strap 172 allows a user to carry the device 100 over the shoulder with minimal effort. The strap can be any strap 172 known in the art.

In another embodiment, the device 100 may be comprised of at least one hook 190 located on the side surface 150. The hook 190 can be any hook known in the art and is used to hang the device 100 on a wall located in the workspace or garage. The ability to hang the device 100 on the wall provides a user with an out-of-the-way and convenient way to store the device 100 when it is not in use. In a differing embodiment, the device 100 may be comprised of at least one strap 180 located on the side wall 150 and connected via at least one fastener 182. This allows a user to roll the device 100 up and fasten the straps 180 via a fastener 182 for easy storage. There is a plurality of fasteners 182 that may be used such as, but not limited to: hook and loop, snap button, buckle, magnetic, etc.

The device 100 also may be comprised of at least one light source 230, further powered by at least one battery 232. The light source 230 may be angle adjustable (180-degree range of motion) to allow a user to be able to see under the vehicle in any direction. The light source 230 may be any light source 230 known in the art such as, but not limited to, LED light, fluorescent light, white light, spotlight, area light, fiber optic illuminator, etc. Further, the light source 230 can be any wattage known in the art. The light source 230 is further powered by at least one battery 232. The battery 232 can be in the form of an alkaline, nickel-cadmium, nickel-metal hydride battery, etc., such as any 3V-12-volt DC battery 232 or other conventional battery 232 such as A, AA, AAA, etc., that supplies power to the light source 230. Throughout this specification, the terms "battery" and "batteries" may be used interchangeably to refer to one or more wet or dry cells or batteries 232 of cells in which chemical energy is converted into electricity and used as a source of DC power. References to recharging or replacing batteries 232 may refer to recharging or replacing individual cells, individual batteries 232 of cells, or a package of multiple battery cells as is appropriate for any given battery 232 technology that may be used.

Figure 2:
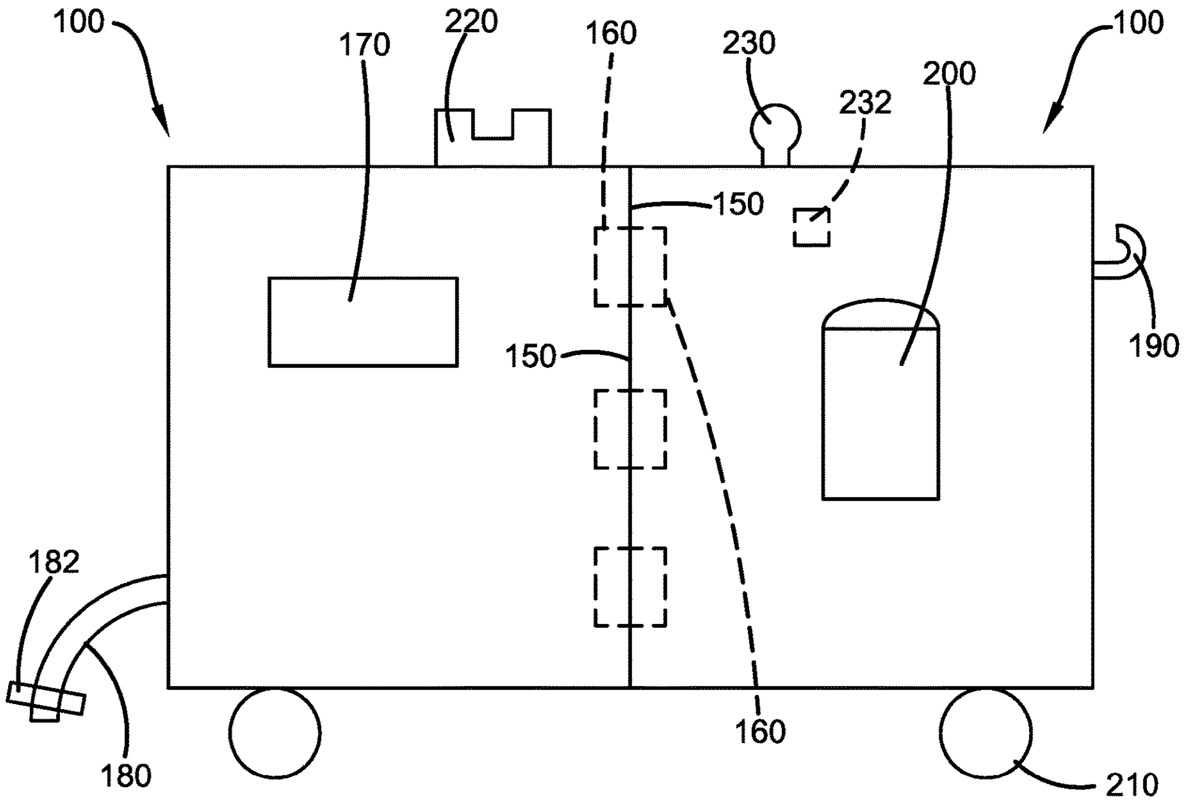
FIG. 2 illustrates a side view of one potential embodiment of a magnetic mat device of the present invention in accordance with the disclosed architecture.

FIG. 2 illustrates a side view of one potential embodiment of a magnetic mat device 100 of the present invention in accordance with the disclosed architecture. The device 100 is further comprised of a multitude of side surfaces 150. These side surfaces 150 further may be comprised of at least one magnet 160. The magnets 160 can be any magnet that is known in the art such as, but not limited to, neodymium iron boron, samarium cobalt, alnico, ferrite, electromagnet, etc. The magnets 160 allow for multiple devices 100 to be attached together to cover any size work area. A user can place and attach many devices 100 side by side to fill any work area so there are no gaps or spaces that allow the nuts, bolts, screws, parts, and sockets to escape onto a non-magnetized surface.

Figure 3:
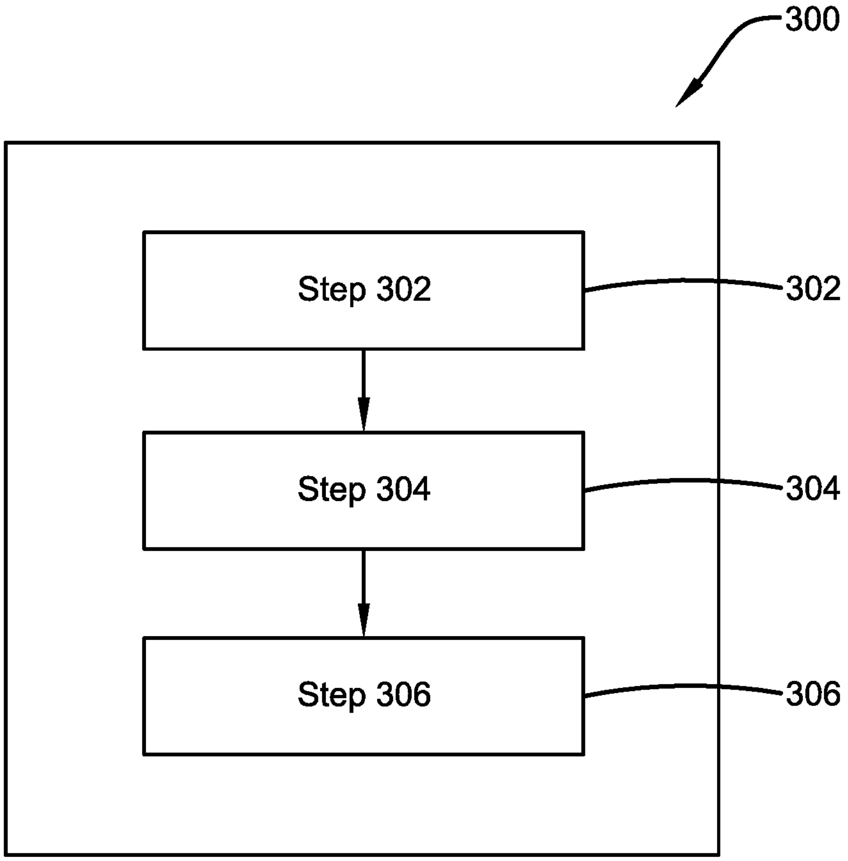
FIG. 3 illustrates a flowchart of one potential method of using one potential embodiment of the magnetic mat device of the present invention in accordance with the disclosed architecture.

FIG. 3 illustrates a flowchart of one potential method 300 of using one potential embodiment of the magnetic mat device 100 of the present invention in accordance with the disclosed architecture. First, the user will place one device 100 on the ground of the work area where they wish to use the device 100 [Step 302]. Then, the user will place any other number of devices 100 they need to cover the work area [Step 304]. Next, the user will connect the multitude of devices 100 via the magnets 160 on the side surfaces 150 of each device 100 [Step 306]. As a result, while a user is working on the vehicle, any metal parts that fall onto the device 100 will be retained on the device such that they can be easily found.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "magnetic mat device" and "device" are interchangeable and refer to the magnetic mat device 100 of the present invention.

Notwithstanding the foregoing, the magnetic mat device 100 of the present invention and its various components can be of any suitable size and configuration as is known in the art without affecting the overall concept of the invention, provided that they accomplish the above-stated objectives. One of ordinary skill in the art will appreciate that the size, configuration, and material of the magnetic mat device 100 as shown in the FIGS. are for illustrative purposes only, and that many other sizes and shapes of the magnetic mat device 100 are well within the scope of the present disclosure.

Although the dimensions of the magnetic mat device 100 are important design parameters for user convenience, the magnetic mat device 100 may be of any size, shape and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A magnetic mat device comprising:
- a body comprised of a top layer, a middle layer and a bottom layer;
- a magnet;
- a pouch;
- a wheel;
- a tool pan; and
- a light source.

2. The magnetic mat device of claim 1, wherein a top surface of the top layer is comprised of a padding.

3. The magnetic mat device of claim 1, wherein a bottom surface of the bottom layer is comprised of a protrusion.

4. The magnetic mat device of claim 3, wherein the protrusion is comprised of a non-slip material.

5. The magnetic mat device of claim 1, wherein the tool pan is comprised of a metal material.

6. The magnetic mat device of claim 1, wherein the wheel is positioned on a bottom surface of the bottom layer.

7. The magnetic mat device of claim 6, wherein the wheel is a thread on core wheel, a solid wheel, a flat free wheel, a semi-pneumatic wheel or a pneumatic wheel.

8. The magnetic mat device of claim 1 further comprised of a battery.

9. The magnetic mat device of claim 1, wherein the light source is an LED light.

10. The magnetic mat device of claim 1, wherein the magnet is positioned on a side surface of the body.

11. The magnetic mat device of claim 10, wherein the magnet is a neodymium iron boron magnet, a samarium cobalt magnet, an alnico magnet, a ferrite magnet or an electromagnet.

* * * * *